US008805939B2

(12) United States Patent
Ye et al.

(10) Patent No.: US 8,805,939 B2
(45) Date of Patent: Aug. 12, 2014

(54) GAMING NOTIFICATIONS AGGREGATOR

(75) Inventors: Lan Ye, Redmond, WA (US); Neeraj Garg, Redmond, WA (US); Raj Jain, Woodinville, WA (US); Shiraz J. Cupala, Seattle, WA (US); Eric Hull, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 952 days.

(21) Appl. No.: 12/938,933

(22) Filed: Nov. 3, 2010

(65) Prior Publication Data

US 2012/0108320 A1 May 3, 2012

(51) Int. Cl.
*G06F 15/16* (2006.01)
*G06F 12/00* (2006.01)

(52) U.S. Cl.
USPC .......................................... 709/206; 709/207

(58) Field of Classification Search
USPC .......... 709/206–207, 217–218, 223–229, 250
See application file for complete search history.

(56) References Cited

U.S. PATENT DOCUMENTS

| | | | |
|---|---|---|---|
| 6,709,331 B2 * | 3/2004 | Berman | 463/16 |
| 7,493,427 B2 | 2/2009 | Freimuth et al. | |
| 7,546,350 B2 | 6/2009 | Deen et al. | |
| 2004/0230661 A1 | 11/2004 | Rashid et al. | |
| 2006/0052159 A1 * | 3/2006 | Cahill et al. | 463/27 |
| 2008/0153600 A1 * | 6/2008 | Swarna | 463/43 |
| 2008/0171588 A1 * | 7/2008 | Atashband | 463/20 |
| 2008/0275956 A1 | 11/2008 | Saxena et al. | |
| 2008/0303837 A1 | 12/2008 | Swift et al. | |
| 2009/0029776 A1 * | 1/2009 | Ruppert et al. | 463/42 |
| 2009/0187620 A1 | 7/2009 | Kisel et al. | |
| 2009/0264190 A1 * | 10/2009 | Davis et al. | 463/26 |
| 2010/0094952 A1 | 4/2010 | Lindgren et al. | |

OTHER PUBLICATIONS

Vastenburg, Martijn H., David V. Keyson and Huib De Ridder. "Considerate Home Notification Systems: A User Study of Acceptability of Notifications in a Living Room Laboratory." International Journal of Human-Computer Studies, Sep. 2009, pp. 814-826, vol. 67, Issue 9. Academic Press, Inc. Duluth, MN, USA.

* cited by examiner

*Primary Examiner* — Zarni Maung
(74) *Attorney, Agent, or Firm* — Sung Kim; Leonard Smith; Micky Minhas

(57) ABSTRACT

A system and method for aggregating and consolidating game notifications is described. In one aspect, game related notifications of different types, from different game sessions, from different games, and from different gaming platforms are aggregated and further consolidated, according to a set of consolidation rules, into a single consolidated environment. The consolidated environment may be projected to and managed from a variety of different gaming devices including mobile devices, gaming and media consoles, and personal computers.

11 Claims, 10 Drawing Sheets

Requests

Nudge     601

> Game: Scrabble

> Player ID: Scott B (Scott Bilas)

Your-turn     602

> Game: Hexic

> Player ID: mizcatdragon (Cathy Wilcox)

Invitation     603

> Game: Bubble Town

> Player ID: mizcatdragon (Cathy Wilcox)

Invitation     604

> Game: Guitar Hero 5

> Player ID: Brad_G

Game message: "Isn't this a great game!"     605

> Game: Scrabble

> Player ID: Scott B (Scott Bilas)

Requests

Invitations to begin a new game session

> To play Bubble Town with mizcatdragon     701

> To play Guitar Hero 5 with Brad_G     702

Action requested in an active game session

> Nudge in Scrabble from mizcatdragon     703

> Your-turn in Hexic from Scott B     704

> Gifts ready for acceptance in Farmville (8 items)     705
-- 4 pigs, 2 cows, 2 baby elephants Notifications from Sally Gamer > Invitation to play Scrabble     706

> Your-turn in Checkers     707

System notifications

> Scrabble game with Cspeed_NW will expire in 2 hours     708

GAMING NOTIFICATIONS AGGREGATOR

BACKGROUND

The video game experience has evolved from one in which an isolated gaming experience was provided into one in which users on a variety of processing devices, such as personal computers, gaming consoles, and mobile devices, communicate with each other to share a common gaming experience. One example of an online gaming system that enables users to communicate with each other is Microsoft's Xbox 360 Live® online game service. Using such online gaming systems, users are provided with a gaming experience which may be shared between friends and other gamers located anywhere in the world.

Online gaming systems commonly provide notification to users of various gaming related activities via email, website messages, or in-game messages. The various gaming related activities may include invitations to start a new game session, turn notices, nudges, and game score notifications. Today, online gaming systems display various notifications for the same and different games in separate lists causing a disjointed experience. For example, each game on a mobile phone maintains its own notification list and therefore a game player must go to each game separately in order to view the respective game notification list. For some online gaming systems, the number of game notifications may become large and cumbersome to manage, especially if multiple games are involved.

SUMMARY

Technology is described for aggregating and consolidating game notifications. In one embodiment, the disclosed technology aggregates and consolidates game related notifications of different types, from different games, from different game sessions, and from different gaming platforms into a consolidated environment. The consolidated environment may be projected to and managed from a variety of different gaming devices including mobile devices, gaming and media consoles, and personal computers. The consolidated environment provides game players with an efficient and convenient means for managing their game related notifications.

One example of a method for aggregating gaming notifications includes receiving gaming notifications from one or more gaming sessions, aggregating the received gaming notifications into an aggregated set of gaming notifications, consolidating the received gaming notifications, and outputting at least a consolidated game notification. The step of outputting may include transmitting the at least a consolidated game notification to a mobile device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 4 depicts one embodiment of a consolidated list of game notifications.

FIG. 5 depicts one embodiment of a consolidated list of game notifications.

DETAILED DESCRIPTION

Technology is described for aggregating and consolidating game notifications. In one embodiment, the disclosed technology aggregates and consolidates game related notifications of different types, from different games, from different game sessions, and from different gaming platforms into a consolidated environment. The consolidated environment may be projected to and managed from a variety of different gaming devices including mobile devices, gaming and media consoles, and personal computers. The consolidated environment provides game players with an efficient and convenient means for managing their game related notifications.

The disclosed technology may be practiced using game notifications from a variety of different types of computer games including online versions of classical board games such as chess or checkers, action games including first person shooting games, action adventure games featuring long term obstacles as well as components of action games, simulation-type games based on construction or life simulation, role playing games where a user is cast in a particular role in one or more adventures which may or may not utilize specific skill sets, strategy games, vehicle simulation games, social games such as those found on Facebook™, and music games.

The disclosed technology may be practiced using single player games, synchronous multiplayer games, or asynchronous "turn-based" multiplayer games. Asynchronous "turn-based" games may be played asynchronously and do not require all players to be connected to a particular game session at the same time. Turn-based games allow game players to play with others without having to dedicate long periods of continuous time to gameplay or having to coordinate times with multiple players to be online at the same time. Moreover, turn-based games allow games to be played in environments where maintaining a synchronous connection is difficult (e.g., mobile devices in transit between a home environment and a work environment). For example, turn-based games allow a game player to begin a game at home on a desktop computer, make game related moves on a handheld phone while in transmit from home to work, and then to finish the game on a gaming console at a friend's house.

Figure 1:
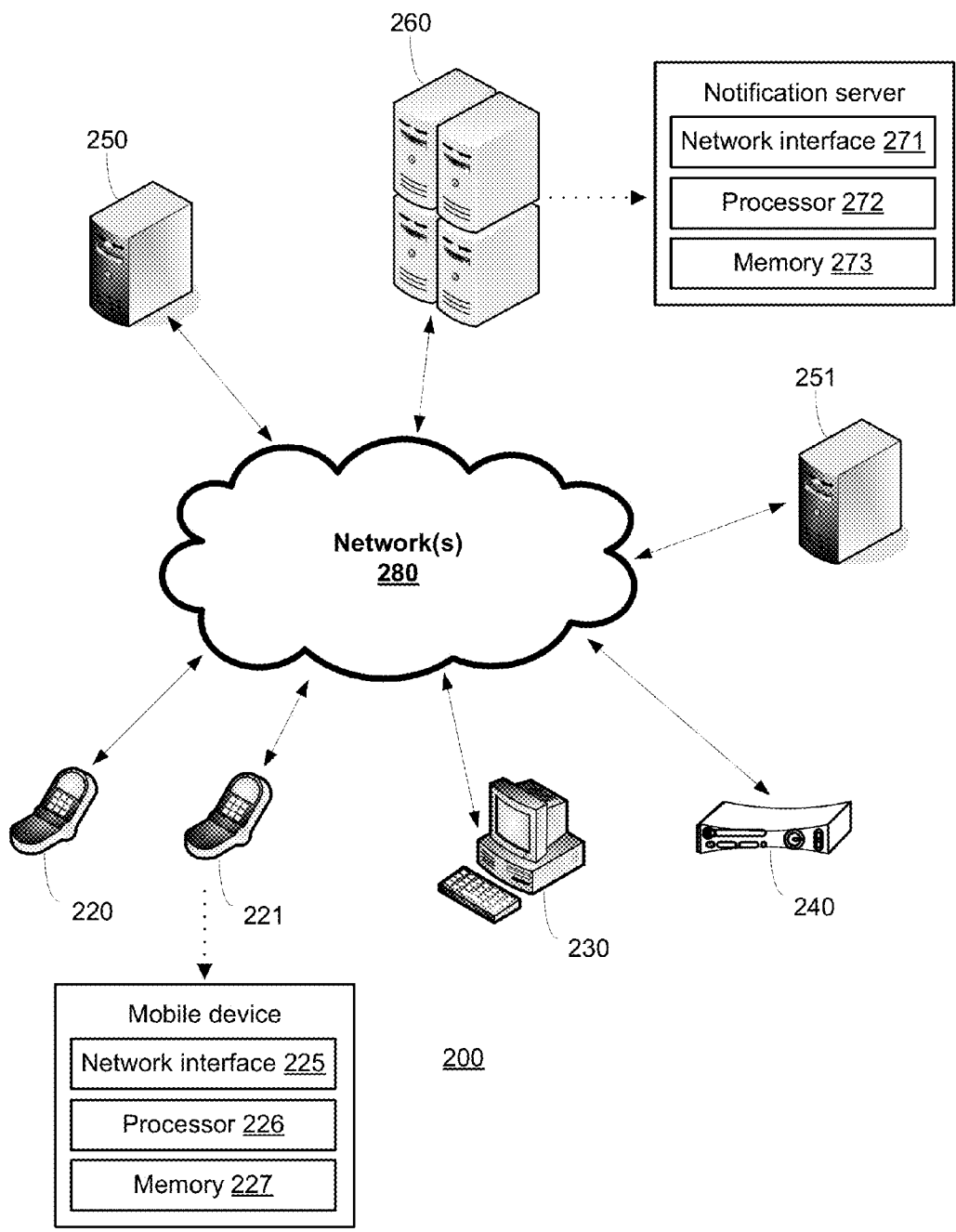
FIG. 1 is a block diagram of one embodiment of a networked computing environment.

FIG. 1 is a block diagram of one embodiment of a networked computing environment 200 in which aggregation and consolidation of game notifications may be practiced. Networked computing environment 200 includes a plurality of computing devices interconnected through one or more networks 280. The one or more networks 280 allow a particular computing device to connect to and communicate with another computing device. The computing devices include mobile devices 220 and 221, desktop computer 230, gaming console 240, game servers 250 and 251, and notification server 260. In some embodiments, the plurality of computing devices may include other computing devices (not shown). The one or more networks 280 may include a secure network such as an enterprise private network, an unsecure network such as a wireless open network, a local area network (LAN), a wide area network (WAN), and the Internet. Each network of the one or more networks 280 may include hubs, bridges, routers, switches, and wired transmission media such as a wired network or direct-wired connection.

One embodiment of notification server 260 includes network interface 271, processor 272, and memory 273. Network interface 271 allows notification server 260 to connect to one or more networks 280. Processor 272 allows notification server 260 to execute computer readable instructions stored in memory 273.

One embodiment of mobile device 221 includes network interface 225, processor 226, and memory 227. Network interface 225 allows mobile device 221 to connect to one or more networks 280. Processor 226 allows mobile device 221 to execute computer readable instructions stored in memory 227.

In one embodiment of a networked computing environment 200, game play is practiced without having to rely on a game server in order to maintain the state of a game session. Instead, the game state itself may be communicated between one or more of the computing devices as a game related notification, either directly or through notification server 260. In one example, in a game of chess being played between users of mobile devices 220 and 221, the "your-turn" game notification communicated from mobile device 220 to mobile device 221 may include incremental state change information sufficient to determine the current state of the chess game, or the current state of the chess game itself.

In general, a "server" may include a hardware device that acts as the host in a client-server relationship or a software process that shares a resource with or performs work for one or more clients. Communication between computing devices in a client-server relationship may be initiated by a client sending a request to the server asking for access to a particular resource or for particular work to be performed. The server may subsequently perform the actions requested and send a response back to the client. While mobile devices, desktop computers, and gaming consoles are not typically classified as servers, under certain situations, they may act as and be classified as servers.

In general, a game "session" may involve game play from the beginning of a particular game to the last actions considered to be part of the particular game. A game session may run on one or more computing devices and involve one or more game players. Different game sessions of a particular game may run on a single computing device, or on separate computing devices. For example, a first game session of the game Scrabble® may be played on a first computer concurrent with a different game session of the game Scrabble® played on the first computer or a different computer.

In one embodiment of a networked computing environment 200, mobile device 220 communicates with game server 250 and receives/transmits game related data associated with a particular game session running on game server 250. When a game related notification is generated, game server 250 transmits the game related notification to notification server 260. Game related notifications may include an invitation to play a game, a "your-turn" notification, a nudge notification to make the next move, a gift notification, a game achievement notification, a game score notification, a game state notification, or a notification that a game is about to expire or be terminated due to inactivity. Game related notifications may be generated automatically by game server 250, upon the request of a game player, or by a game client running on a computing device.

In some embodiments, notification server 260 may process the game related notifications in order to generate an aggregated set of game related notifications. Further, notification server 260 may consolidate two or more game related notifications within the aggregated set of game related notifications to form a consolidated game notification. Subsequently, via consolidation of game related notifications, a smaller consolidated set of game related notifications may be generated. The aggregated and/or consolidated set of game related notifications may then be transmitted to one or more of the computing devices within networked computing environment 200. Performing the processing steps necessary to generate the consolidated set of game related notifications on notification server 260 may help improve battery lifetime for those computing devices that depend on a battery for power (e.g., mobile devices). In addition, storing the consolidated set of game related notifications on notification server 260 allows a single consolidated view of the game related notifications to be viewed and/or managed from one or more of the computing devices.

In one embodiment of a networked computing environment 200, desktop computer 230 communicates with game server 250 and receives/transmits game related data associated with a particular game running on game server 250. When a game related notification is generated, game server 250 stores the game related notification. Subsequently, mobile device 220 communicates with game server 250 and game server 250 transmits the game related notification to mobile device 220.

In another embodiment, when a game related notification is generated, game server 250 transmits the game related notification to notification server 260. The notification server 260 then generates a consolidated set of game related notifications and transmits the consolidated set of game related notifications to mobile device 220 or other computing devices (e.g., mobile device 221, desktop computer 230, or gaming console 240) within the plurality of computing devices interconnected through one or more networks 280.

In another embodiment, when a game related notification is generated, game server 250 transmits the game related notification to notification server 260. Once two or more game related notifications are received by notification server 260, processor 272 executes computer readable instructions stored in memory 273 in order to generate an aggregated set of game related notifications. The aggregated set of game related notifications is then transmitted to mobile device 221. Once the aggregated set of game related notifications is received by mobile device 221, processor 226 executes computer readable instructions stored in memory 227 in order to generate a consolidated set of game related notifications. In some embodiments, the consolidated set of game related notifications may subsequently be transmitted to other computing devices (e.g., desktop computer 230 or gaming console 240) within the plurality of computing devices interconnected through one or more networks 280.

Figure 2:
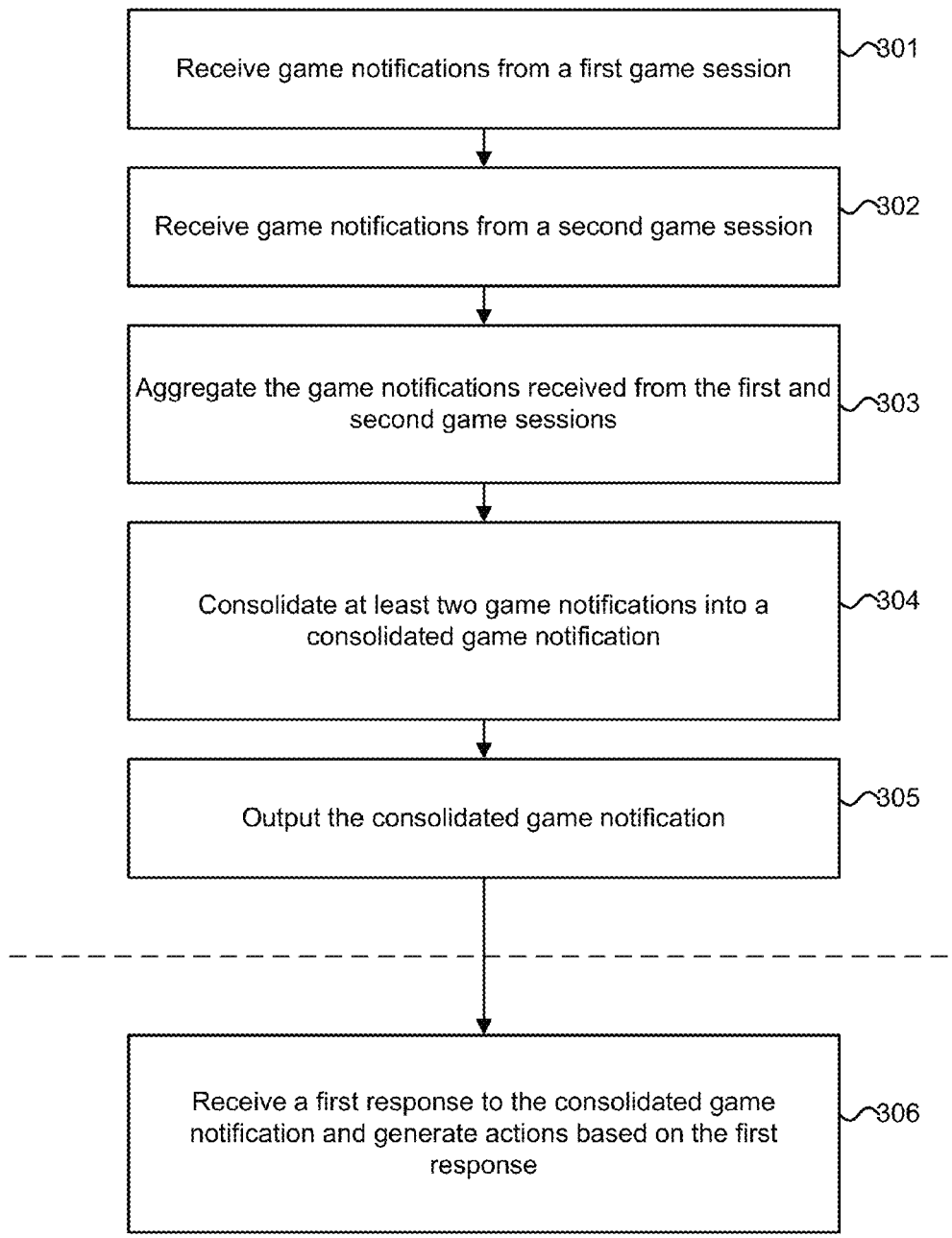
FIG. 2 is a flowchart describing one embodiment of a process for aggregating and consolidating game notifications.

FIG. 2 is a flowchart describing one embodiment of a process for aggregating and consolidating game notifications. The process of FIG. 2 may be performed by one or more computing devices. Each step in the process of FIG. 2 may be performed by the same or different computing devices as those used in other steps, and each step need not necessarily be performed by a single computing device. In step 301, one or more first game notifications from a first game session are received by a computing device such as notification server 260 in FIG. 1. In step 302, one or more second game notifications from a second game session are received by a computing device such as notification server 260 in FIG. 1. In one embodiment, the one or more first game notifications are transmitted from a game server, such as game server 250 in FIG. 1, in response to a request from notification server 260. In another embodiment, the one or more first game notifications are received from a first game server, such as game server 250 in FIG. 1, and the one or more second game notifications are received from a second game server, such as game server 251 in FIG. 1.

In step 303, the one or more first game notifications and the one or more second game notifications are aggregated into an aggregated set of game notifications. In one embodiment, the process of aggregating game notifications is performed on notification server 260 in FIG. 1. In another embodiment, the step of aggregating game notifications is performed on mobile device 220 in FIG. 1. The process of aggregating game notifications may be performed on game notifications of the same or different types, and on game notifications from the same or different games, game sessions, platforms, and/or gaming systems. The aggregated game notifications may be stored in a memory, such as memory 273 or memory 227 in FIG. 1, as an aggregated list or other data structure suitable for storing data. The game notifications may also be aggregated and stored in a game notifications database running on one or more computing devices.

In step 304, at least a first notification of the aggregated set of game notifications and at least a second notification of the aggregated set of game notifications are consolidated into a consolidated game notification. In one embodiment, the consolidated game notification is included within a consolidated set of game notifications. In some embodiments, the consolidated set of game notifications provides information for only a particular subset of the aggregated set of game notifications. For example, the consolidated set of game notifications may comprise the three most recent invitations out of ten invitations, or the five highest game scores out of fifty game scores for a particular game.

In step 305, the consolidated game notification is outputted. In one embodiment, the step of outputting includes displaying the consolidated game notification on the display of a mobile device. In another embodiment, the step of outputting includes transmitting the consolidated game notification to a mobile device. In step 306, one or more actions are generated based on a first response to the consolidated game notification, the one or more actions are responsive to the first notification of the aggregated set of game notifications and the second notification of the aggregated set of game notifications.

Figure 3:
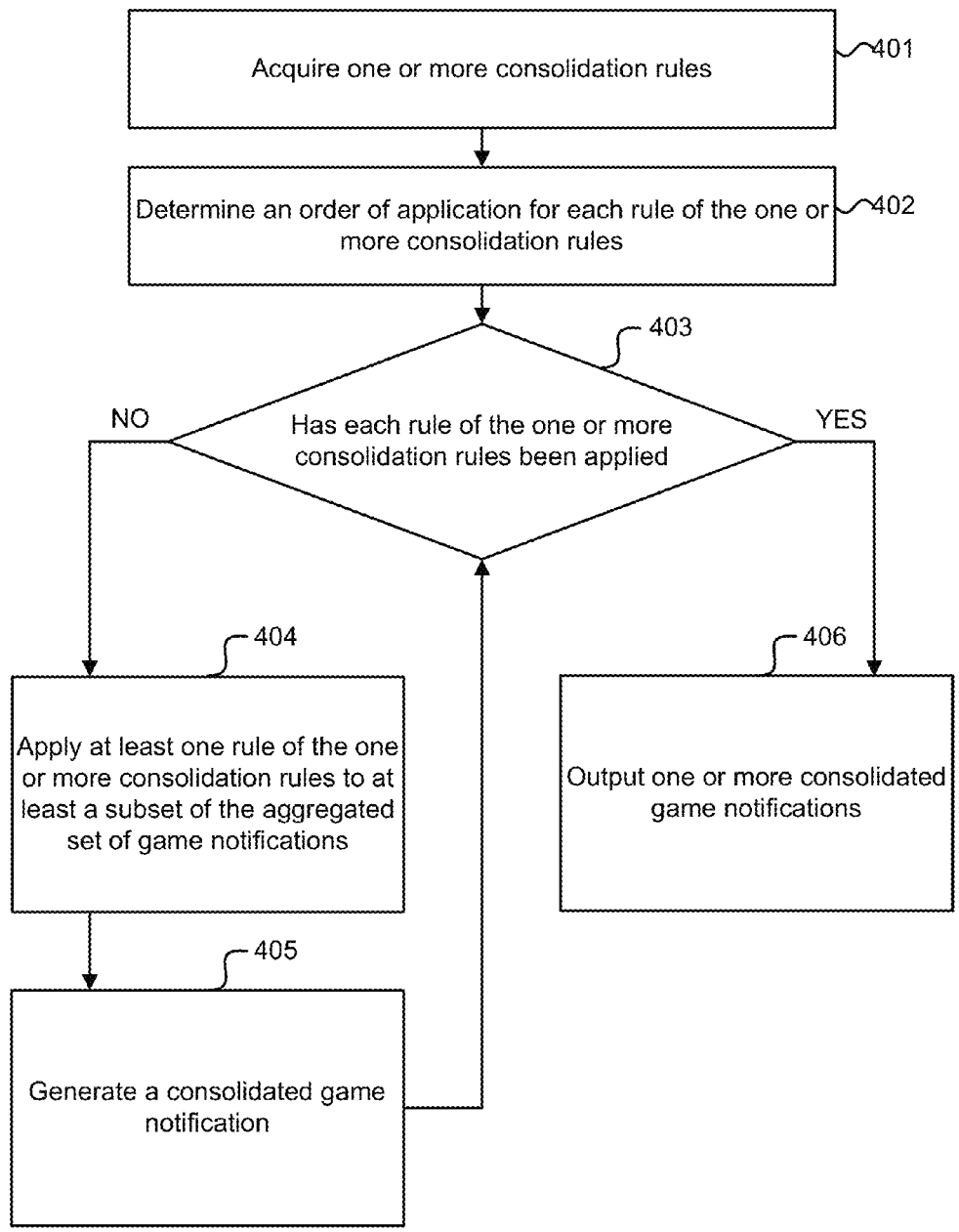
FIG. 3 is a flowchart describing one embodiment of a process for generating one or more consolidated game notifications.

FIG. 3 is a flowchart describing one embodiment of a process for generating one or more consolidated game notifications. The process described in FIG. 3 is only one example of a process for implementing step 304 in FIG. 2. The process of FIG. 3 may be performed on one or more computing devices. In step 401, one or more consolidation rules are acquired. In one embodiment, notification server 260 in FIG. 1 acquires the one or more consolidation rules by reading data stored in memory 273. In another embodiment, the one or more consolidation rules may be acquired by reading a game player profile. The game player profile may include information such as which consolidation rules to apply and the order in which the consolidation rules should be applied to game notifications received by a particular game player. The one or more consolidation rules may include rules for consolidating game notifications of different or common types, consolidating game notifications associated with a particular player identifier, and consolidating game notifications for game notifications of a particular type and associated with a particular game session.

In one embodiment of a consolidation rule, the consolidation rule consolidates game notifications associated with at least one particular game notification category or field. Game notification categories may include the notification type (e.g., an invitation or nudge), the person or entity associated with generating the game notification, a particular game, a particular game session, the time elapsed since generation of the game notification, or the time remaining until the game notification expires or causes a game-level event to occur (e.g., a forced move or a forfeiture of a turn). In one embodiment, a consolidation rule consolidates nudges and "your-turn" notifications associated with a particular game session. In another embodiment, all game notifications requesting an action be performed by a particular person are consolidated. In another embodiment, all game invitations to begin a particular game (e.g., Scrabble®) are consolidated into a single game notification representing the most recent invitation to play.

In step 402, an order of application for each rule of the one or more consolidation rules is determined. For example, a consolidation rule for consolidating all game notifications associated with a particular player identifier may be applied prior to another consolidation rule for consolidating all invitations to play a particular game.

In step 403, a determination is made as to whether or not each rule of the one or more consolidation rules has been applied. If not all of the one or more consolidation rules have been applied, then steps 404 and 405 are processed. If all of the one or more consolidation rules have been applied, then step 406 is processed.

In step 404, at least one rule of the one or more consolidation rules is applied to at least a subset of the aggregated set of game notifications in the order determined in step 402. In one embodiment, both the one or more consolidation rules and the aggregated set of game notifications are stored in databases. For each consolidation rule, the database storing the aggregated set of game notifications is searched and game notifications meeting specific search criteria are returned. The returned game notifications are then consolidated in accordance with the consolidation rule being applied. In another embodiment, both the set of consolidation rules and the aggregated set of game notifications are stored in separate lists. For each consolidation rule, the list storing the aggregated set of game notifications is searched and game notifications meeting specific search criteria are returned. The returned game notifications are then consolidated in accordance with the consolidation rule being applied. In another In step 405, a consolidated game notification is generated based on step 404. In step 406, the one or more consolidated game notifications are outputted. In one embodiment, after each rule of the one or more consolidation rules has been applied, a consolidated set of game notifications is generated containing the one or more consolidated game notifications.

In one embodiment, a game player customizes at least one consolidation rule of the one or more consolidation rules. Customization of the consolidation rules may include specifying which consolidation rules to apply and in what order the consolidation rules should be applied. The game player customization may occur and/or be stored on a mobile device used by the game player, such as mobile device 221 in FIG. 1, or on a notification server, such as notification server 260 in FIG. 1. In another embodiment, a system administrator of notification server 260 in FIG. 1 customizes a first consolidation rule of the one or more consolidation rules.

In one embodiment of a process for generating one or more consolidated game notifications, at least two game notifications generated by a single player or "instanced" game are consolidated if the at least two game notifications are associated with the same game achievement. For example, a first game achievement notification that the game player is "only 14 bunnies away from the Were-Rabbit achievement" may be consolidated with a second, and more recent, game achievement notification that the game player is "only 10 bunnies away from the Were-Rabbit achievement." In another example, a first game achievement notification that "Your friend <Billyboy667> just got 5 cherries in Wonderland slots" may be consolidated with a second, and more recent, game notification that "Your friend <Sallygirl112> just got 7 cherries in Wonderland slots."

FIG. 4 depicts one embodiment of a consolidated list of game notifications 600. A consolidated list of game notifications includes at least one consolidated game notification. The consolidated list of game notifications 600 includes four game notifications 601-605. Each game notification in FIG. 4 includes a game field and player ID field. The game field identifies the particular game for which a notification is associated. The player ID field provides identification information associated with the player or entity responsible for generating the notification.

Game notification 601 comprises a nudge notification. Game notification 602 comprises a "your-turn" notification. Nudge notifications and "your-turn" notifications may be sent as reminders to a player that their turn is due or that a particular action is requested. Both nudge and "your-turn" notifications may be automatically generated when a player has not made a move within a given period of time, or manually generated by other game players who are waiting on the player's turn. In one embodiment, multiple nudge notifications for the same game session are collapsed into a single nudge notification. In one example, game notification 601 may be a consolidated game notification comprising the most recent nudge notification out of a plurality of nudge notifications received by notification server 260 in FIG. 1.

Game notifications 603 and 604 comprise invitation notifications. Upon acceptance of an invitation notification to play a particular game, a new game session of the particular game will be created. In one embodiment, a set of more than two invitation notifications are consolidated into a consolidated set of invitation notifications. In one example, game notifications 603 and 604 may comprise the two most recent invitation notifications out of ten invitation notifications received by notification server 260 in FIG. 1.

Game notification 605 comprises a game message notification. In one embodiment, multiple game messages for the same game session are collapsed into a single game message. In one example, game notification 605 may be a consolidated game notification comprising the most recent game message for a particular game of Scrabble® out of a plurality of game messages received by notification server 260 in FIG. 1.

FIG. 5 depicts one embodiment of a consolidated list of game notifications 700. A consolidated list of game notifications includes at least one consolidated game notification. The consolidated list of game notifications 700 includes game notifications 701-708. Each game notification in FIG. 5 includes at least information regarding the notification type and the particular game for which a notification is associated.

In one embodiment of a process for consolidating game notifications, a first game notification and a second game notification are consolidated if both the first game notification and the second game notification are associated with the same player or player identifier. A particular game player may be associated with one or more player identifiers. For example, game player "Cathy Wilcox" may be associated with player identifiers "mizcatdragon" and "C_Wilcox." In one example, game notifications 706 and 707 comprise the two most recent game notifications out of three sent from game player "Sally Gamer." In another example, only the most recent game notification out of a plurality of game notifications generated by a particular game player may be transmitted from notification server 260 in FIG. 1.

In another embodiment of a process for consolidating game notifications, a first game notification and a second game notification are consolidated if both the first game notification and the second game notification are of the same type and are associated with the same game session. In a particular game session, there may be multiple players sending notifications of a particular type. For example, in a game of Scrabble®, three different game players associated with different player identifiers may all send nudge notifications to one particular player. In this case, all the nudge notifications may be consolidated into a single nudge notification and transmitted to the one particular player. In one example, game notification 703 is a consolidated game notification based on three different nudge notifications sent from three different players participating in a Scrabble® game session. In this case, game notification 703 is a single notification comprising the most recent nudge notification.

In another embodiment, a first game notification and a second game notification are consolidated if both the first game notification and the second game notification are of the same type, associated with the same game session, and associated with the same player identifier. For example, in a game of Scrabble®, three different game players associated with different player identifiers may all send nudge notifications to one particular player. In this case, all the nudge notifications associated with a particular player identifier may be consolidated into a single nudge notification, and therefore three different consolidated nudge notifications (a single nudge notification associated with each of the three player identifiers) may be received by the one particular player.

In one embodiment of a process for consolidating game notifications, a set of two or more nudges and "your-turn" notifications are consolidated into a consolidated set of action-requested game notifications. In one example, game notifications 703 and 704 may comprise the two most recent notifications out of eight nudges and ten "your-turn" notifications.

In one embodiment, a first game notification and a second game notification are consolidated if they are both system notifications warning of expiration of a particular game session. The consolidated game notification may include the total number of pending system notifications. System notifications may include notification that a particular game session is about to expire, or that a particular game-level event (e.g., a forced move or a forfeiture of a turn) will occur unless a particular game player takes an action in a particular game session. In one example, game notification 708 comprises the highest priority system notification out of seven system notifications, the highest priority system notification being the system notification with the least time remaining until expiration of a particular game.

In another embodiment, a first game notification and a second game notification are consolidated if they are both gift notifications associated with a particular game and associated with a particular game player. The consolidated gift notification may include information regarding the gifts associated with both the first game notification and the second game notification. In one example, game notification 705 comprises a consolidated gift notification based on three individual Farmville™ gift notifications. The three individual Farmville™ gift notifications included one gift notification for four pigs, one gift notification for two cows, and one gift notification for two baby elephants. In one embodiment, the consolidated gift notification may be accepted (or not accepted) causing all three individual gift notifications to be accepted (or not accepted). In another embodiment, the consolidated gift notification may be flattened causing the consolidated gift notification to be deleted and replaced by the three individual gift notifications.

In one embodiment of a process for consolidating game notifications, a first consolidation rule is applied prior to a second consolidation rule. In one example, a first consolidation rule for consolidating game notifications associated with a particular player identifier is applied prior to a second consolidation rule for consolidating invitation notifications into the two most recent invitation notifications. In FIG. 5, game notifications 701 and 702 are the two most recent invitation notifications. However, because the first consolidation rule is applied prior to the second consolidation rule, game notification 706 is not consolidated into the consolidated set of invitation notifications.

Figure 6:
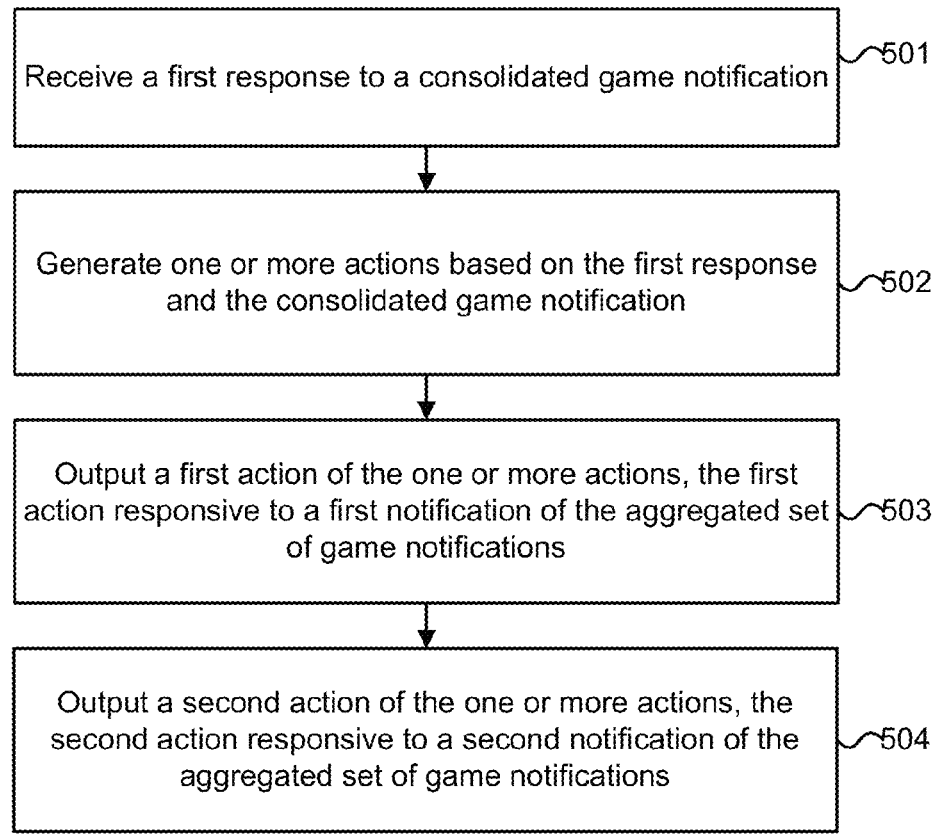
FIG. 6 is a flowchart describing one embodiment of a process for managing responses to a consolidated game notification.

FIG. 6 is a flowchart describing one embodiment of a process for managing responses to a consolidated gaming notification. The process described in FIG. 6 is only one example of a process for implementing step 306 in FIG. 2. The process of FIG. 6 may be performed on one or more computing devices. Referring to FIG. 2, at step 305 the consolidated game notification may be transmitted to another computing device or displayed on a particular computing device. After step 305, an end user and/or a computing device that receives the outputted consolidated game notification may generate a first response to the consolidated game notification. For example, based on a consolidated game notification comprising a consolidated gift notification, an end user may decide to accept all gifts represented by the consolidated gift notification (e.g., via selection on a touch-sensitive display). In one embodiment, the "accept all gifts" response is transmitted back to the computing device that transmitted the consolidated game notification. In another embodiment, the response to a consolidated game notification is received by and handled by the computing device used by the end user who generated the response.

In step 501, a first response to a consolidated game notification is received. In one embodiment, notification server 260 in FIG. 1 receives the first response. In step 502, one or more actions are generated based on the first response and the consolidated game notification. In one embodiment, notification server 260 in FIG. 1 receives the first response and generates the number of actions required to satisfy the first response to the consolidated game notification. In this case, the number of one or more actions may depend on whether a particular game application programming interface (API) can handle a consolidated response to individual game notifications or requires individual responses for each game notification. In step 503, a first action of the one or more actions is outputted in response to a first notification that was previously consolidated into the consolidated gaming notification. In step 504, a second action of the one or more actions is outputted in response to a second notification that was previously consolidated into the consolidated gaming notification. For example, the first notification may be a first gift notification for a baby elephant in the game Farmville™ and the second notification may be a second gift notification for two cows in the game Farmville™. In this case, the first action may respond to the first notification by accepting the baby elephant and the second action may respond to the second notification by accepting the two cows. In one embodiment, all gifts associated with a consolidated gaming notification are accepted. In another embodiment, all gifts associated with a consolidated game notification are declined.

The disclosed technology may be used in various gaming systems. FIGS. 7-10 provide examples of various gaming systems that can be used to implement embodiments of the disclosed technology.

Figure 7:
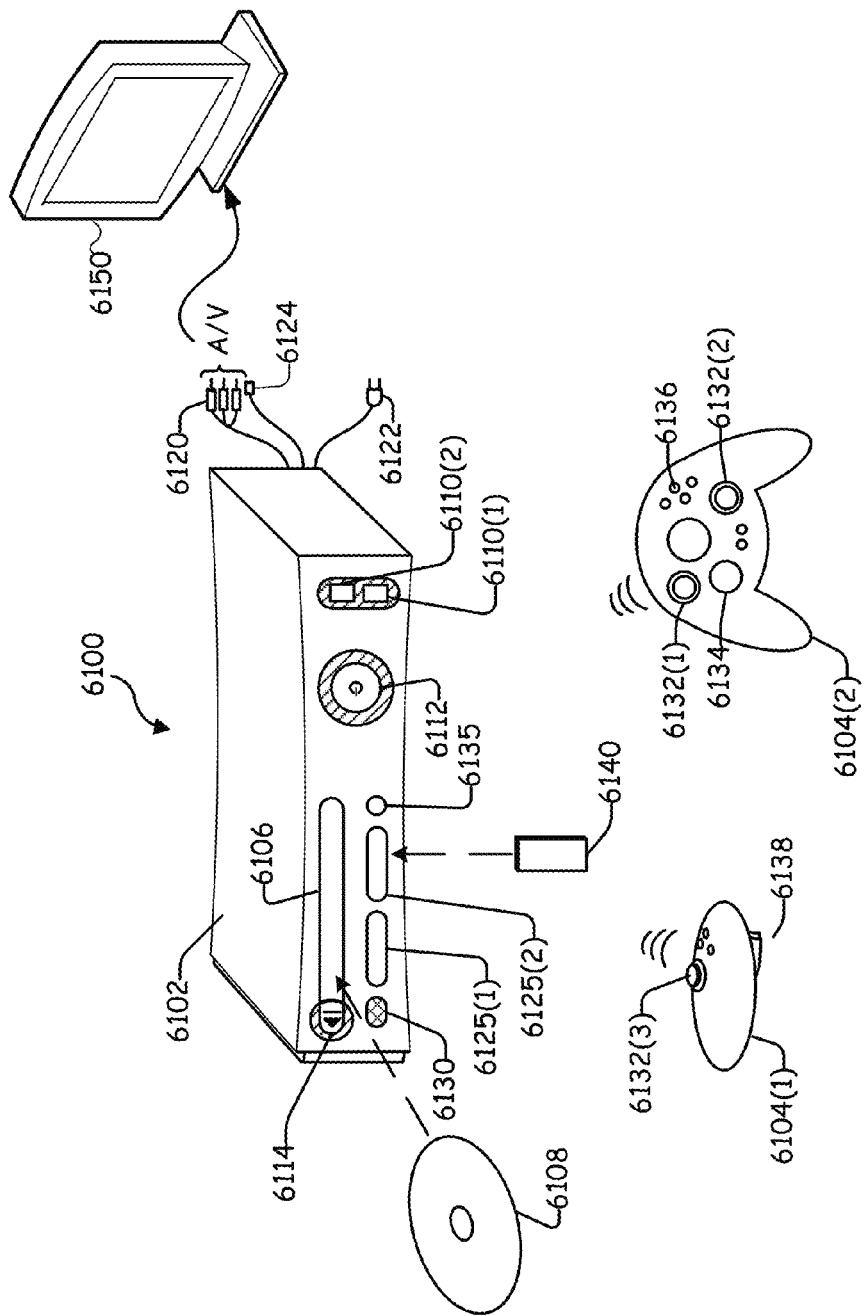
FIG. 7 depicts one embodiment of a gaming and media system.

FIG. 7 depicts one embodiment of a gaming and media system 6100. The following discussion of FIG. 7 is intended to provide a brief, general description of a suitable environment in which the concepts presented herein may be implemented. As shown in FIG. 7, gaming and media system 6100 includes a game and media console (hereinafter "console") 6102. In general, console 6102 is one type of computing system, as will be further described below. Console 6102 is configured to accommodate one or more wireless controllers, as represented by controllers 6104(1) and 6104(2). Console 6102 is equipped with an internal hard disk drive (not shown) and a portable media drive 6106 that support various forms of portable storage media, as represented by optical storage disc 6108. Examples of suitable portable storage media include DVD, CD-ROM, and game discs. Console 6102 also includes two memory unit card receptacles 6125(1) and 6125(2), for receiving removable flash-type memory units 6140. A command button 6135 on console 6102 enables and disables wireless peripheral support.

As depicted in FIG. 7, console 6102 also includes an optical port 6130 for communicating wirelessly with one or more devices and two USB (Universal Serial Bus) ports 6110(1) and 6110(2) to support a wired connection for additional controllers, or other peripherals. In some implementations, the number and arrangement of additional ports may be modified. A power button 6112 and an eject button 6114 are also positioned on the front face of game console 6102. Power button 6112 is selected to apply power to the game console, and can also provide access to other features and controls, and eject button 6114 alternately opens and closes the tray of a portable media drive 6106 to enable insertion and extraction of a storage disc 6108.

Console 6102 connects to a television or other display (such as monitor 6150) via A/V interfacing cables 6120. In one implementation, console 6102 is equipped with a dedicated A/V port (not shown) configured for content-secured digital communication using A/V cables 6120 (e.g., A/V cables suitable for coupling to a High Definition Multimedia Interface "HDMI" port on a high definition monitor 6150 or other display device). A power cable 6122 provides power to the game console. Console 6102 may be further configured with broadband capabilities, as represented by a cable or modem connector 6124 to facilitate access to a network, such as the Internet. The broadband capabilities can also be provided wirelessly, through a broadband network such as a wireless fidelity (Wi-Fi) network.

Each controller 6104 is coupled to console 6102 via a wired or wireless interface. In the illustrated implementation, the controllers 6104(1) and 6104(2) are USB-compatible and are coupled to console 6102 via a wireless or USB port 6110. Console 6102 may be equipped with any of a wide variety of user interaction mechanisms. For example, in FIG. 7, controller 6104(2) is equipped with two thumbsticks 6132(1) and 6132(2), a D-pad 6134, and buttons 6136, and controller 6104(1) is equipped with thumbstick 6132(3) and triggers 6138. These controllers are merely representative, and other known gaming controllers may be substituted for, or added to, those shown in FIG. 7.

In one implementation, a memory unit (MU) 6140 may be inserted into controller 6104(2) to provide additional and portable storage. Portable MUs enable users to store game parameters for use when playing on other consoles. In one embodiment, each controller is configured to accommodate two Mus 6140, although more or less than two MUs may also be employed. In another embodiment, a Universal Serial Bus (USB) flash memory storage may also be inserted into controller 6104(2) to provide additional and portable storage.

Gaming and media system 6100 is generally configured for playing games stored on a memory medium, as well as for downloading and playing games, and reproducing pre-recorded music and videos, from both electronic and hard media sources. With the different storage offerings, titles can be played from the hard disk drive, from an optical disk media (e.g., 6108), from an online source, or from MU 6140.

During operation, console 6102 is configured to receive input from controllers 6104(1) and 6104(2) and display information on display 6150. For example, console 6102 can display a user interface on display 6150 to allow a user to perform the operations of the disclosed technology discussed herein.

Figure 8:
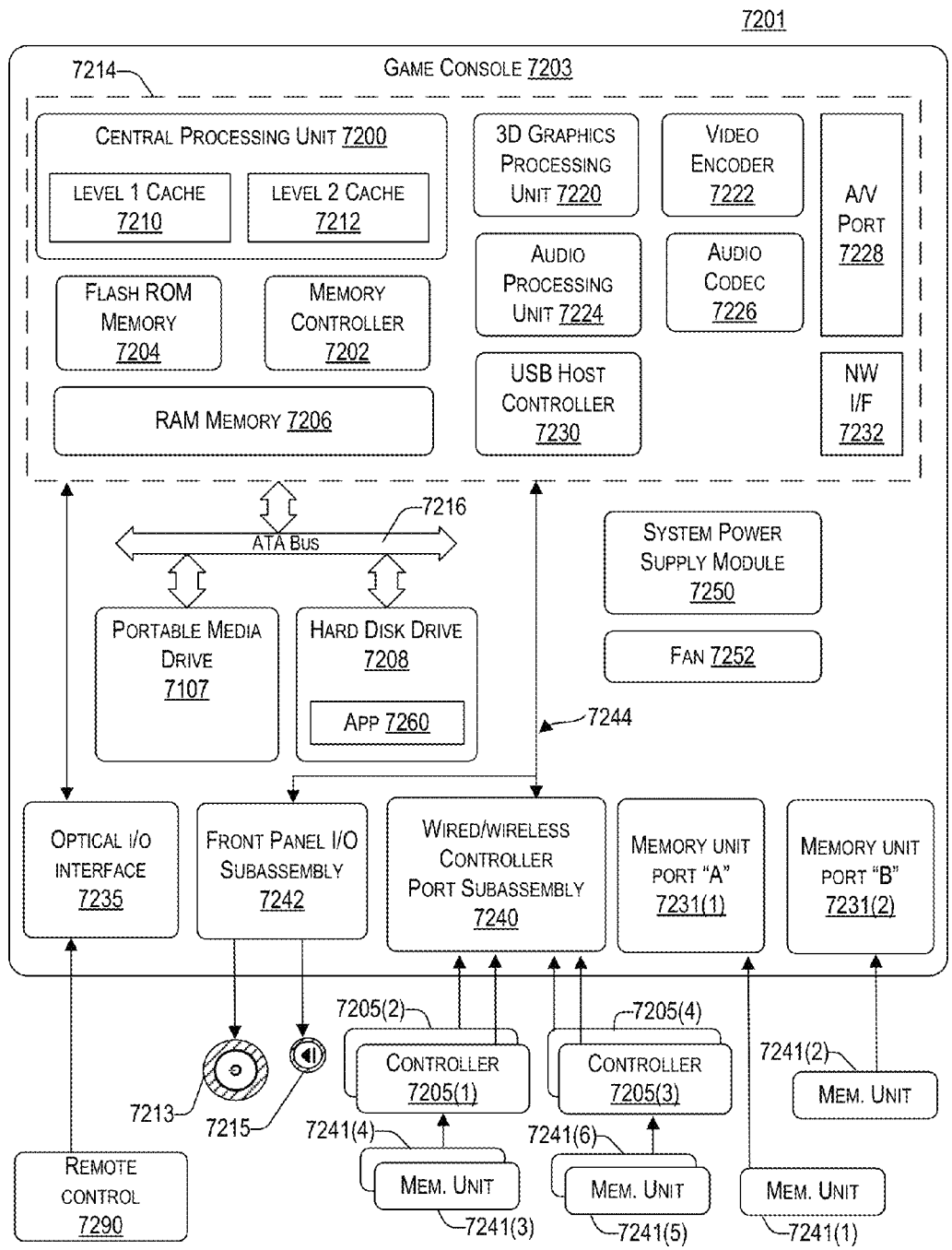
FIG. 8 is a block diagram of an embodiment of a gaming and media system.

FIG. 8 is a block diagram of an embodiment of a gaming and media system 7201 (such as system 6100). Console 7203 has a central processing unit (CPU) 7200, and a memory controller 7202 that facilitates processor access to various types of memory, including a flash Read Only Memory (ROM) 7204, a Random Access Memory (RAM) 7206, a hard disk drive 7208, and portable media drive 7107. In one implementation, CPU 7200 includes a level 1 cache 7210 and a level 2 cache 7212, to temporarily store data and hence reduce the number of memory access cycles made to the hard drive 7208, thereby improving processing speed and throughput.

CPU 7200, memory controller 7202, and various memory devices are interconnected via one or more buses (not shown). The one or more buses might include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus.

In one implementation, CPU 7200, memory controller 7202, ROM 7204, and RAM 7206 are integrated onto a common module 7214. In this implementation, ROM 7204 is configured as a flash ROM that is connected to memory controller 7202 via a PCI bus and a ROM bus (neither of which are shown). RAM 7206 is configured as multiple Double Data Rate Synchronous Dynamic RAM (DDR SDRAM) modules that are independently controlled by memory controller 7202 via separate buses (not shown). Hard disk drive 7208 and portable media drive 7107 are shown connected to the memory controller 7202 via the PCI bus and an AT Attachment (ATA) bus 7216. However, in other implementations, dedicated data bus structures of different types may also be applied in the alternative.

A three-dimensional graphics processing unit 7220 and a video encoder 7222 form a video processing pipeline for high speed and high resolution (e.g., High Definition) graphics processing. Data are carried from graphics processing unit 7220 to video encoder 7222 via a digital video bus (not shown). An audio processing unit 7224 and an audio codec (coder/decoder) 7226 form a corresponding audio processing pipeline for multi-channel audio processing of various digital audio formats. Audio data are carried between audio processing unit 7224 and audio codec 7226 via a communication link (not shown). The video and audio processing pipelines output data to an A/V (audio/video) port 7228 for transmission to a television or other display. In the illustrated implementation, video and audio processing components 7220-7228 are mounted on module 7214.

FIG. 8 shows module 7214 including a USB host controller 7230 and a network interface 7232. USB host controller 7230 is in communication with CPU 7200 and memory controller 7202 via a bus (not shown) and serves as host for peripheral controllers 7205(1)-7205(4). Network interface 7232 provides access to a network (e.g., Internet, home network, etc.) and may be any of a wide variety of various wire or wireless interface components including an Ethernet card, a modem, a wireless access card, a Bluetooth module, a cable modem, and the like.

In the implementation depicted in FIG. 8, console 7203 includes a controller support subassembly 7240 for supporting four controllers 7205(1)-7205(4). The controller support subassembly 7240 includes any hardware and software components needed to support wired and wireless operation with an external control device, such as for example, a media and game controller. A front panel I/O subassembly 7242 supports the multiple functionalities of power button 7213, the eject button 7215, as well as any LEDs (light emitting diodes) or other indicators exposed on the outer surface of console 7203. Subassemblies 7240 and 7242 are in communication with module 7214 via one or more cable assemblies 7244. In other implementations, console 7203 can include additional controller subassemblies. The illustrated implementation also shows an optical I/O interface 7235 that is configured to send and receive signals (e.g., from remote control 7290) that can be communicated to module 7214.

MUs 7241(1) and 7241(2) are illustrated as being connectable to MU ports "A" 7231(1) and "B" 7231(2) respectively. Additional MUs (e.g., MUs 7241(3)-7241(6)) are illustrated as being connectable to controllers 7205(1) and 7205(3), i.e., two MUs for each controller. Controllers 7205(2) and 7205(4) can also be configured to receive MUs (not shown). Each MU 7241 offers additional storage on which games, game parameters, and other data may be stored. Additional memory devices, such as portable USB devices, can be used in place of the MUs. In some implementations, the other data can include any of a digital game component, an executable gaming application, an instruction set for expanding a gaming application, and a media file. When inserted into console 7203 or a controller, MU 7241 can be accessed by memory controller 7202. A system power supply module 7250 provides power to the components of gaming system 7201. A fan 7252 cools the circuitry within console 7203.

An application 7260 comprising machine instructions is stored on hard disk drive 7208. When console 7203 is powered on, various portions of application 7260 are loaded into RAM 7206, and/or caches 7210 and 7212, for execution on CPU 7200. Other applications may also be stored on hard disk drive 7208 for execution on CPU 7200.

Gaming and media system 7201 may be operated as a standalone system by simply connecting the system to a monitor, a television, a video projector, or other display device. In this standalone mode, gaming and media system 7201 enables one or more players to play games or enjoy digital media (e.g., by watching movies or listening to music). However, with the integration of broadband connectivity made available through network interface 7232, gaming and media system 7201 may further be operated as a participant in a larger network gaming community.

Figure 9:
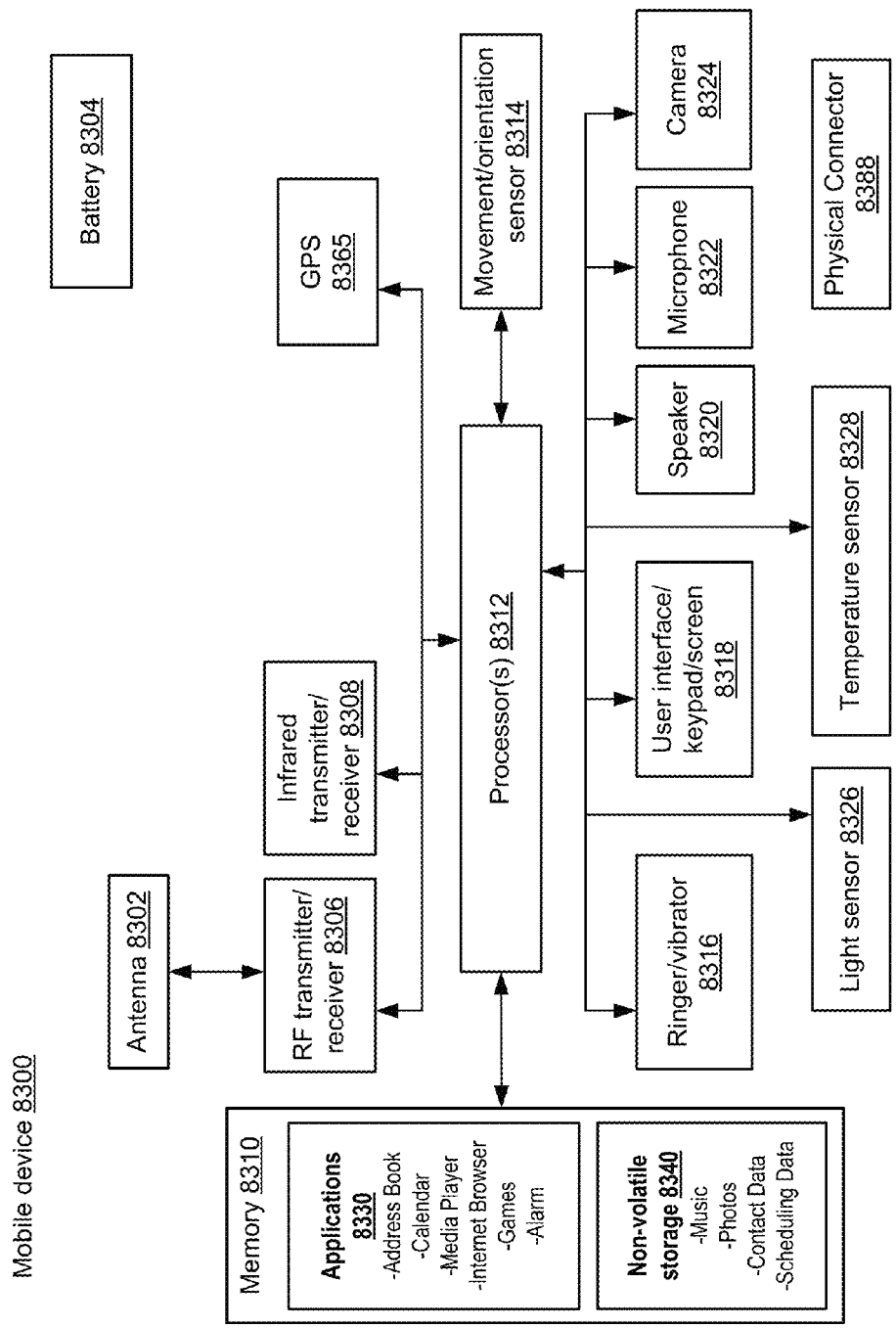
FIG. 9 is a block diagram of an embodiment of a mobile device.

FIG. 9 is a block diagram of one embodiment of a mobile device 8300. Mobile devices may include laptop computers, pocket computers, mobile phones, personal digital assistants, and handheld media devices that have been integrated with wireless receiver/transmitter technology.

Mobile device 8300 includes one or more processors 8312 and memory 8310. Memory 8310 includes applications 8330 and non-volatile storage 8340. Memory 8310 can be any variety of memory storage media types, including non-volatile and volatile memory. A mobile device operating system handles the different operations of the mobile device 8300 and may contain user interfaces for operations, such as placing and receiving phone calls, text messaging, checking voicemail, and the like. The applications 8330 can be any assortment of programs, such as a camera application for photos and/or videos, an address book, a calendar application, a media player, an internet browser, games, an alarm application, and other applications. The non-volatile storage component 8340 in memory 8310 may contain data such as music, photos, contact data, scheduling data, and other files.

The one or more processors 8312 also communicates with RF transmitter/receiver 8306 which in turn is coupled to an antenna 8302, with infrared transmitter/receiver 8308, with global positioning service (GPS) receiver 8365, and with movement/orientation sensor 8314 which may include an accelerometer and/or magnetometer. RF transmitter/receiver 8308 may enable wireless communication via various wireless technology standards such as Bluetooth or the IEEE 802.11 standards. Accelerometers have been incorporated into mobile devices to enable applications such as intelligent user interface applications that let users input commands through gestures, and orientation applications which can automatically change the display from portrait to landscape when the mobile device is rotated. An accelerometer can be provided, e.g., by a micro-electromechanical system (MEMS) which is a tiny mechanical device (of micrometer dimensions) built onto a semiconductor chip. Acceleration direction, as well as orientation, vibration, and shock can be sensed. The one or more processors 8312 further communicate with a ringer/vibrator 8316, a user interface keypad/screen 8318, a speaker 8320, a microphone 8322, a camera 8324, a light sensor 8326, and a temperature sensor 8328. The user interface keypad/screen may include a touch-sensitive screen display.

The one or more processors 8312 controls transmission and reception of wireless signals. During a transmission mode, the one or more processors 8312 provide voice signals from microphone 8322, or other data signals, to the RF transmitter/receiver 8306. The transmitter/receiver 8306 transmits the signals through the antenna 8302. The ringer/vibrator 8316 is used to signal an incoming call, text message, calendar reminder, alarm clock reminder, or other notification to the user. During a receiving mode, the RF transmitter/receiver 8306 receives a voice signal or data signal from a remote station through the antenna 8302. A received voice signal is provided to the speaker 8320 while other received data signals are processed appropriately.

Additionally, a physical connector 8388 may be used to connect the mobile device 8300 to an external power source, such as an AC adapter or powered docking station, in order to recharge battery 8304. The physical connector 8388 may also be used as a data connection to an external computing device. The data connection allows for operations such as synchronizing mobile device data with the computing data on another device.

Figure 10:
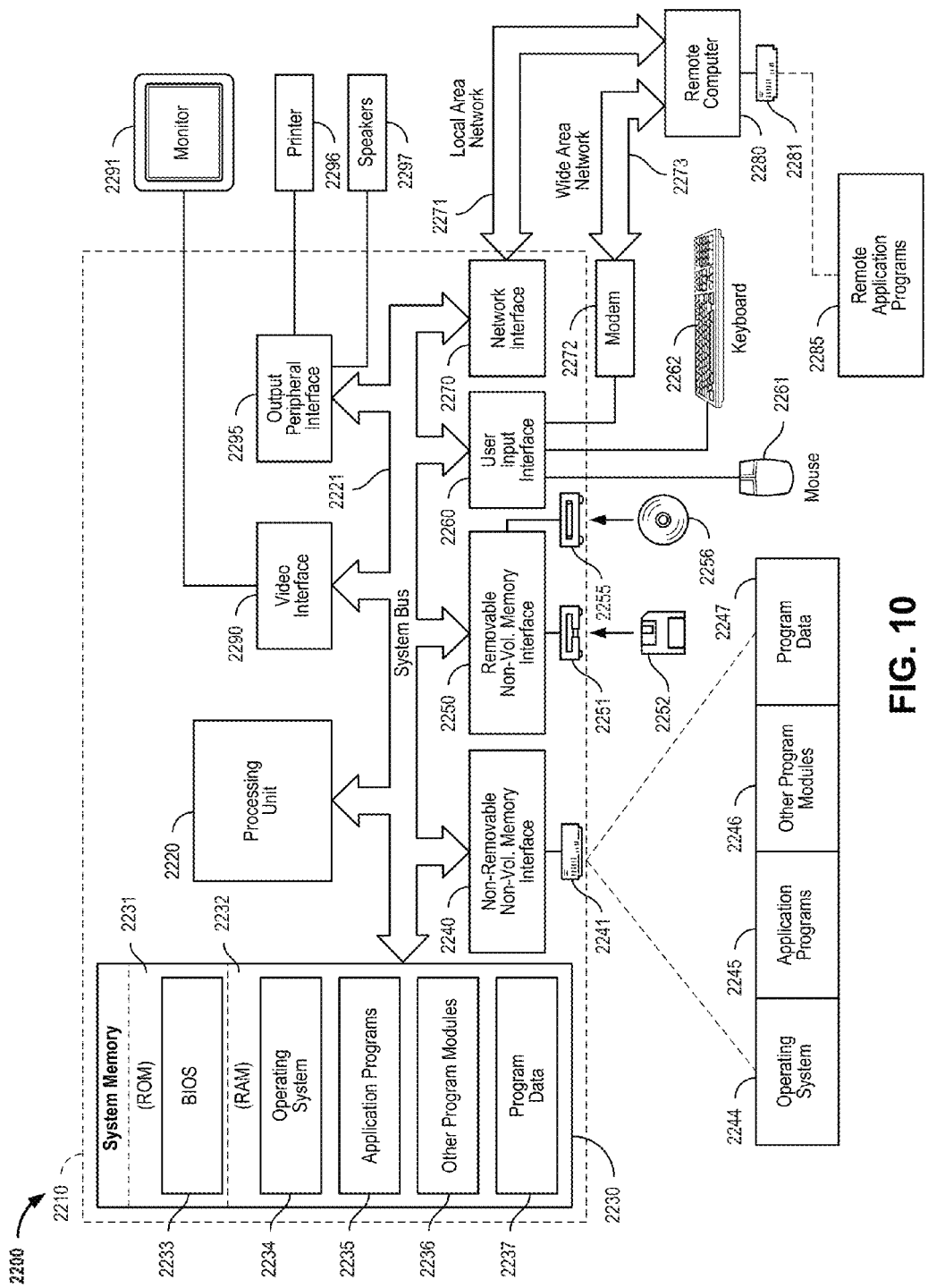
FIG. 10 is a block diagram of an embodiment of a computing system environment.

FIG. 10 is a block diagram of an embodiment of a computing system environment 2200. Computing system environment 2200 includes a general purpose computing device in the form of a computer 2210. Components of computer 2210 may include, but are not limited to, a processing unit 2220, a system memory 2230, and a system bus 2221 that couples various system components including the system memory 2230 to the processing unit 2220. The system bus 2221 may be any of several types of bus structures including a memory bus, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 2210 typically includes a variety of computer readable media. Computer readable media can be any available media that can be accessed by computer 2210 and includes both volatile and nonvolatile media, removable and non-removable media. By way of example, and not limitation, computer readable media may comprise computer storage media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 2210. Combinations of the any of the above should also be included within the scope of computer readable media.

The system memory 2230 includes computer storage media in the form of volatile and/or nonvolatile memory such as read only memory (ROM) 2231 and random access memory (RAM) 2232. A basic input/output system 2233 (BIOS), containing the basic routines that help to transfer information between elements within computer 2210, such as during start-up, is typically stored in ROM 2231. RAM 2232 typically contains data and/or program modules that are immediately accessible to and/or presently being operated on by processing unit 2220. By way of example, and not limitation, FIG. 10 illustrates operating system 2234, application programs 2235, other program modules 2236, and program data 2237.

The computer 2210 may also include other removable/non-removable, volatile/nonvolatile computer storage media. By way of example only, FIG. 10 illustrates a hard disk drive 2241 that reads from or writes to non-removable, nonvolatile magnetic media, a magnetic disk drive 2251 that reads from or writes to a removable, nonvolatile magnetic disk 2252, and an optical disk drive 2255 that reads from or writes to a removable, nonvolatile optical disk 2256 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 2241 is typically connected to the system bus 2221 through an non-removable memory interface such as interface 2240, and magnetic disk drive 2251 and optical disk drive 2255 are typically connected to the system bus 2221 by a removable memory interface, such as interface 2250.

The drives and their associated computer storage media discussed above and illustrated in FIG. 10, provide storage of computer readable instructions, data structures, program modules and other data for the computer 2210. In FIG. 10, for example, hard disk drive 2241 is illustrated as storing operating system 2244, application programs 2245, other program modules 2246, and program data 2247. Note that these components can either be the same as or different from operating system 2234, application programs 2235, other program modules 2236, and program data 2237. Operating system 2244, application programs 2245, other program modules 2246, and program data 2247 are given different numbers here to illustrate that, at a minimum, they are different copies. A user may enter commands and information into computer 2210 through input devices such as a keyboard 2262 and pointing device 2261, commonly referred to as a mouse, trackball, or touch pad. Other input devices (not shown) may include a microphone, joystick, game pad, satellite dish, scanner, or the like. These and other input devices are often connected to the processing unit 2220 through a user input interface 2260 that is coupled to the system bus, but may be connected by other interface and bus structures, such as a parallel port, game port or a universal serial bus (USB). A monitor 2291 or other type of display device is also connected to the system bus 2221 via an interface, such as a video interface 2290. In addition to the monitor, computers may also include other peripheral output devices such as speakers 2297 and printer 2296, which may be connected through an output peripheral interface 2295.

The computer 2210 may operate in a networked environment using logical connections to one or more remote computers, such as a remote computer 2280. The remote computer 2280 may be a personal computer, a server, a router, a network PC, a peer device or other common network node, and typically includes many or all of the elements described above relative to the computer 2210, although only a memory storage device 2281 has been illustrated in FIG. 10. The logical connections depicted in FIG. 10 include a local area network (LAN) 2271 and a wide area network (WAN) 2273, but may also include other networks. Such networking environments are commonplace in offices, enterprise-wide computer networks, intranets and the Internet.

When used in a LAN networking environment, the computer 2210 is connected to the LAN 2271 through a network interface or adapter 2270. When used in a WAN networking environment, the computer 2210 typically includes a modem 2272 or other means for establishing communications over the WAN 2273, such as the Internet. The modem 2272, which may be internal or external, may be connected to the system bus 2221 via the user input interface 2260, or other appropriate mechanism. In a networked environment, program modules depicted relative to the computer 2210, or portions thereof, may be stored in the remote memory storage device. By way of example, and not limitation, FIG. 10 illustrates remote application programs 2285 as residing on memory device 2281. It will be appreciated that the network connections shown are exemplary and other means of establishing a communications link between the computers may be used.

The disclosed technology is operational with numerous other general purpose or special purpose computing system environments or configurations. Examples of well known computing systems, environments, and/or configurations that may be suitable for use with the technology include, but are not limited to, personal computers, server computers, handheld or laptop devices, multiprocessor systems, microprocessor-based systems, set top boxes, programmable consumer electronics, network PCs, minicomputers, mainframe computers, distributed computing environments that include any of the above systems or devices, and the like.

The disclosed technology may be described in the general context of computer-executable instructions, such as program modules, being executed by a computer. Generally, software and program modules as described herein include routines, programs, objects, components, data structures, and other types of structures that perform particular tasks or implement particular abstract data types. Hardware or combinations of hardware and software may be substituted for software modules as described herein.

The disclosed technology may also be practiced in distributed computing environments where tasks are performed by remote processing devices that are linked through a communications network. In a distributed computing environment, program modules may be located in both local and remote computer storage media including memory storage devices.

For purposes of this document, reference in the specification to "an embodiment," "one embodiment," "some embodiments," or "another embodiment" are used to described different embodiments and do not necessarily refer to the same embodiment.

For purposes of this document, a connection can be a direct connection or an indirect connection (e.g., via another part).

For purposes of this document, the term "set" of objects, refers to a "set" of one or more of the objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for aggregating gaming notifications, comprising:
    receiving one or more first game notifications from a first game session;
    receiving one or more second game notifications from a second game session;
    aggregating the one or more first game notifications and the one or more second game notifications into an aggregated set of game notifications;
    consolidating a first notification of the aggregated set of game notifications and a second notification of the aggregated set of game notifications into a consolidated game notification; and
    outputting the consolidated game notification.

2. The method of claim 1, wherein:
    the first notification is one of an invitation to play a game, a "your-turn" notification, a nudge, a gift notification, a game achievement notification, a game score notification, a game state notification, or a notification that the first game is about to expire;
    the first game session is running on a first game server; and
    the second game session is running on a second game server.

3. The method of claim 1, wherein the step of consolidating includes:
    applying each rule of one or more consolidation rules to at least a subset of the aggregated set of game notifications, the at least a subset of the aggregated set of game notifications includes the first notification and the second notification; and
    generating the consolidated game notification based on the step of applying.

4. The method of claim 1, wherein:
    the first notification is from the first game session;
    the second notification is from the first game session; and the step of consolidating includes applying a first consolidation rule to the first notification and the second notification, the first consolidation rule consolidates game notifications of a particular type.

5. The method of claim 4, wherein:

the step of consolidating includes applying a second consolidation rule to the first notification and the second notification, the second consolidation rule consolidates game notifications associated with a particular player identifier, the first consolidation rule is applied subsequent to the second consolidation rule.

6. The method of claim 5, wherein:

at least one consolidation rule from the group consisting of the first consolidation rule and the second consolidation rule is customized for a participant in the first game session.

7. The method of claim 1, wherein:

the step of aggregating is performed on a notification server;

the step of consolidating is performed on the notification server; and the step of outputting includes transmitting the consolidated game notification.

8. The method of claim 1, wherein:

the step of consolidating is performed on a mobile device, the step of consolidating includes reducing redundant game notifications by type; and the step of outputting includes displaying the consolidated game notification as a single game notification.

9. The method of claim 1, wherein:

the step of aggregating is performed on a mobile device;

the step of consolidating is performed on the mobile device, the step of consolidating includes reducing redundant game notifications of a particular type and associated with a player identifier; and the step of outputting includes displaying the consolidated game notification.

10. The method of claim 1, further comprising:

receiving a first response to the consolidated game notification;

determining one or more actions based on the first response and the consolidated game notification;

outputting a first action of the one or more actions, the first action responsive to the first notification of the aggregated set of game notifications; and outputting a second action of the one or more actions, the second action responsive to the second notification of the aggregated set of game notifications.

11. The method of claim 1, wherein:

the consolidated game notification comprises the most recent game notification selected from the group consisting of the first notification and the second notification.

* * * * *